Patented May 16, 1950

2,507,831

UNITED STATES PATENT OFFICE 2,507,831

ALKYL-SULFONIC ACID SALTS OF DIHYDRO-ERGOCRYPTINE

Arthur Stoll and Albert Hofmann, Basel, Switzerland, assignors to Sandoz Limited, Basel, Switzerland, a Swiss firm No Drawing. Application June 5, 1946, Serial No. 674,639. In Switzerland April 20, 1940

3 Claims. (Cl. 260—236)

The present invention is a continuation-in-part of our co-pending patent application, Ser. No. 385,198, filed March 25, 1941, now abandoned, which relates to sympatheticolytically active dihydro-derivatives of lysergic acid amides.

The present invention more particularly relates to the preparation of water-soluble salts of dihydro-ergocryptine.

Dihydro-ergocryptine may be made by a fractional crystallisation of dihydroegotoxine, which itself can be produced by treating ergotoxine with hydrogen under pressure in the presence of a suitable catalyst and of a solvent and, in some cases, at an elevated temperature, the method of production of dihydro-egotoxine being more fully described in our co-pending patent application, Ser. No. 385,198 (cf. Example 3 thereof).

The dihydro-ergocryptine possesses the brutto formula $C_{32}H_{43}O_5N_5$ and is as such almost insoluble in water. The preparation of the water-soluble salts of dihydro-ergocryptine can be carried out by neutralisation of a solution or a suspension of dihydro-ergocryptine in a suitable solvent with alkyl sulphonic acids. The salts of the alkyl sulphonic acids thus obtained are beautifully crystallized compounds which are easily soluble in water giving stable aqueous solutions; the same can be used for therapeutical purposes.

The following examples, without being limitative, describe the present invention.

Example 1

5.77 parts by weight of dihydro-ergocryptine ($1/100$ mol) are dissolved in 200 parts by volume of methanol and treated with 10 parts by volume of n-methanolic solution of methane-sulphonic acid. When concentrating this solution in vacuo, a thick pap of crystals will be obtained. The crystals are filtered and the mother-liquor further concentrated in vacuo. In this manner the dihydro-ergocryptine methane sulphonate will be obtained with a practically theoretical yield in form of white crystal needles that, when dried in vacuo over calcium chloride, melt at 215° C. (corr.) with decomposition. The new compound possesses the brutto formula $C_{32}H_{43}O_5N_5 \cdot CH_3SO_3H$ One part of this new salt is soluble either in 10 parts of hot water or in 80 parts of cold water, yielding stable solutions. The new product is valuable for therapeutical purposes.

Example 2

The dihydro-ergocryptine ethane sulphonate can be prepared in analogous manner to the methane sulphonate by neutralisation of a methylalcoholic solution of the said alkaloid with ethane sulphonic acid. The dihydro-ergocryptine ethane sulphonate is easily soluble in hot methanol and ethanol and crystallizes therefrom, on cooling down, in long beautiful prisms melting at 220° C. (corr.) with decomposition. The new compound has the brutto formula $C_{32}H_{43}O_5N_5 \cdot CH_3CH_2SO_3H$. One part of this salt is soluble either in 10 parts of hot water or in 150 parts of cold water, thus yielding clear stable solutions.

What we claim is:

1. The water-soluble alkyl-sulphonic acid salts of dihydro-ergocryptine of the general formula $C_{32}H_{43}O_5N_5 \cdot$ alkyl $SO_3H$ which are crystallized compounds melting with decomposition and which yield stable aqueous solutions and are suitable for therapeutical use.

2. The water-soluble methane-sulphonic acid salt of dihydro-ergocryptine of the formula $C_{32}H_{43}O_5N_5 \cdot CH_3SO_3H$ which crystallizes from methanol in white needles, melting with decomposition at 215° C. (corr.), one part of which is soluble in 10 parts of hot water and in 80 parts of cold water, yielding stable aqueous solutions, and which is suitable for therapeutical puropses.

3. The water-soluble ethane-sulphonic acid salt of dihydro-ergocryptine of the formula $C_{32}H_{43}O_5N_5 \cdot CH_3CH_2SO_3H$ which crystallizes from methanol and ethanol in long beautiful prisms melting with decomposition at 220° C. (corr.), one part of which is soluble in 10 parts of hot water and in 150 parts of cold water, yielding stable solutions, and which is suitable for therapeutical purposes.

ARTHUR STOLL.
ALBERT HOFMANN.

REFERENCES CITED

The following references are of record in the file of this patent:

UNITED STATES PATENTS

| Number | Name | Date |
|---|---|---|
| 2,086,559 | Kharasch | July 13, 1937 |
| 2,156,242 | Kharasch et al. | Apr. 25, 1939 |

OTHER REFERENCES

Helv. Chim. acta, vol. 26 (1943), pp. 1570–1601; and 2070–2081.